March 22, 1960 W. MARBACK 2,929,886

TELEPHONE HANDSET HOLDER

Filed June 20, 1958

INVENTOR.

WILLIAM MARBACK

BY

McMorrow, Berman + Davidson

ATTORNEYS

United States Patent Office 2,929,886

Patented Mar. 22, 1960

2,929,886

TELEPHONE HANDSET HOLDER

William Marback, Chicago, Ill.

Application June 20, 1958, Serial No. 743,266

7 Claims. (Cl. 179—146)

This invention relates generally to telephone attachments, and more particularly has reference to a device supportable upon the casing of a wall-mounted telephone instrument, said device being specifically designed to serve as a holder for the transmitter-receiver of said instrument.

Wall-mounted telephone instruments are finding increasing favor, since they do not require space upon a table, desk, or other type of horizontal supporting surface. However, a difficulty which has been noted, that represents a substantial inconvenience in the use of telephone instruments of this type, resides in the fact that when it is necessary to leave the instrument temporarily with the transmitter-receiver off the hook or cradle provided therefor, said transmitter-receiver must ordinarily be permitted to dangle loosely from the casing of the instrument.

This is of course undesirable, in view of the fact that the transmitter-receiver will exert a substantial downward force upon the pre-coiled cord by means of which it is connected to the main portion of the instrument. Further, in the circumstances indicated, the transmitter-receiver may swing against the wall, so that in time the wall will show considerable evidence of damage.

In view of the above, it is proposed, in carrying out the present invention, to provide a support or hanger for a transmitter-receiver, so designed that the support may be swiftly connected to the casing of the telephone instrument, in a position such that it will define an auxiliary cradle or support hook for the transmitter-receiver, on which this component of the instrument may be positioned when the instrument is in use and when one finds it necessary to leave the instrument temporarily, as for example for the purpose of locating a called party.

A more specific object of the present invention is to provide a particular form of hanger of the character described, so designed as to permit it to be swiftly and easily engaged with the casing of the telephone instrument, without requiring special connections to the instrument.

Still another object is to so form the device as to permit its attachment to the telephone instrument without requiring any modification or redesign whatever of said instrument.

Yet another object of importance is to provide a support or hanger for a telephone transmitter-receiver of the type described, that will not interfere with normal use of the instrument in any way.

Yet another object of importance is to so form the hanger as to permit its manufacture at a very low cost, considering the benefits to be obtained from the use thereof.

Other objects will appear from the following description, the claims appended thereto, and from the annexed drawing, in which like reference characters designate like parts throughout the several views, and wherein:

Figures 1, 2, 3, 4:
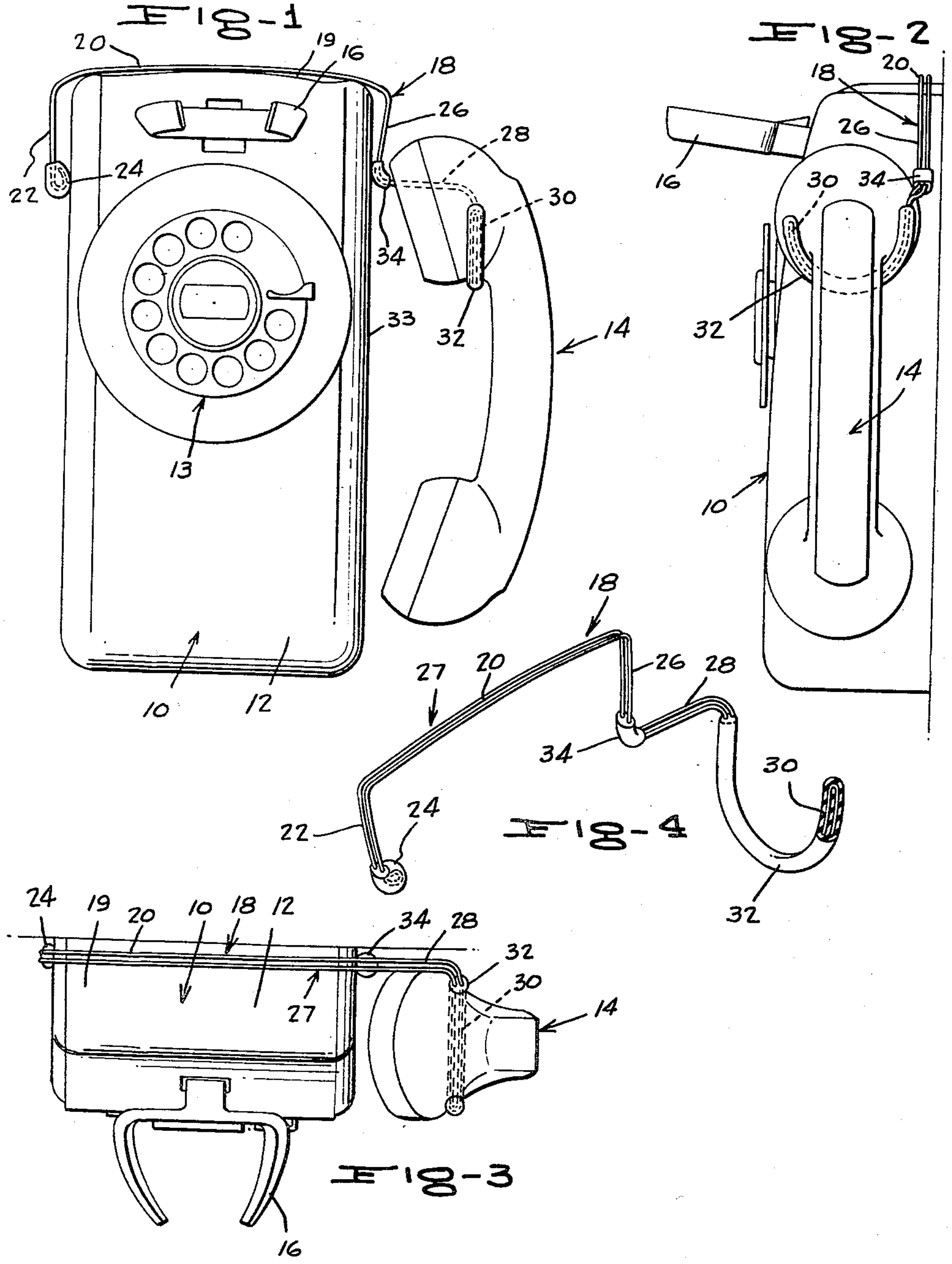
Figure 1 is a front elevational view of a telephone instrument equipped with a handset hanger or support according to the present invention.
Figure 2 is a side elevational view of the instrument with the hanger in use thereon.
Figure 3 is a top plan view of the instrument with the hanger applied thereto; and, Figure 4 is a perspective view of the hanger per se, a portion being shown in section.

Referring to the drawing in detail, generally designated at 10 is a telephone instrument of the type attachable to a vertical surface. This includes the usual generally rectangular casing 12, having on the front thereof the dial mechanism 13. Generally designated at 14 is a conventional transmitter-receiver which will hereinafter be termed the handset. At 16 there is provided the forwardly projecting cradle or support hook on which the transmitter-receiver is normally carried when the telephone instrument is not in use.

All this is, of course, wholly conventional in a telephone instrument of the kind described, and it does not per se comprise part of the present invention.

The device constituting the invention has been generally designated 18, and is designed to be positioned transversely of the top wall 19 of the casing 12. When so positioned, the support or handset hanger 18 grips the casing securely, by reason of an inherent spring tension in the material of which the support 18 is formed.

Support 18, in the illustrated, preferred embodiment, includes a cross member 20 of elongated form, slightly bowed upwardly, so as to conform closely to the slight upward arch of the top wall 19 of the telephone instrument casing. Cross member 20, at one end, is integral with a depending clamp arm 22, on the lower end of which is provided a bulbous enlargement 24 formed of soft rubber or similar material, and designed to protect the surface of the adjacent side wall of the casing 12 from being scratched or otherwise marred by the clamp arm 22.

Cross member 20, at its other end, is integral with a depending clamp arm 26, cooperating with arm 22 in gripping the telephone instrument casing 12. As will be noted, the cross member together with its associated clamp arms defines a body portion of the device comprising the present invention, which body portion is of inverted U-shape. The body portion has been generally designated 27 in the several figures of the drawing, and is designed to straddle the top portion of the telephone instrument casing, with the sides or legs of said body portion being tensioned to grip the respective side walls of the casing.

Integral with the clamp arm 26, at the lower end thereof, is a laterally outwardly projecting support arm 28, merging at its outer end into an upwardly opening hook member 30 encased in soft rubber as at 32 to prevent damage to the transmitter-receiver or handset 14.

As will be noted from Figure 1, the hook member 30 is disposed in a vertical plane generally parallel to and spaced laterally outwardly from the adjacent side wall 33 of the telephone instrument casing 12. The plane of the hook member 30 is perpendicular to the length of the support arm 28, said support arm 28 in turn being perpendicular to the length of the clamp arm 26. It is also to be noted that the arm 28, cross member 20, and clamp arms 22, 26 are all disposed in a common vertical plane perpendicular to the plane of the hook member 30.

In a commercial embodiment, it may be desired that the hook member initially be in a plane common to that of the body portion 27, so that the ultimate purchaser can bend the hook member to the desired position, in either a left hand or a right hand direction, according to whether it is desired to support the handset at the left or alternatively, at the right hand side, of the telephone instrument.

The material of which the device is formed can vary, and in the example given, the device is formed mainly from a single length of wire material bent upon itself medially between its opposite ends. The folded end portions of said length of material are extended in closely spaced, parallel relation, and are held against spreading not only by the enlargement 24 and the protective sleeve 32, but also by a protector or sleeve 34 also formed of soft rubber material, which is disposed at the juncture between the arm 26 and arm 28. Protector 34, thus, bears against the side wall 33 and the telephone instrument casing.

As will be apparent, the device is attached to the telephone instrument merely by being positioned thereover. In these circumstances, the device will grip the instrument casing, ready for use. Further, the device does not in any way interfere with the normal use of the telephone instrument, as will be apparent.

Still further, the device is designed to be manufactured at a very low cost, and will fit a conventional telephone instrument, without requiring any modification or redesign of said instrument.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A support for a telephone handset adapted for attachment to the casing of a wall-mounted telephone instrument comprising a body portion in the general form of an inverted U adapted to engage the upper end of a telephone instrument casing; and means projecting laterally outwardly from one end of said body portion adapted for supporting a telephone handset in a suspended position at one side of said casing.

2. A support for a telephone handset adapted for attachment to the casing of a wall-mounted telephone instrument comprising a body portion in the general form of a shallow, inverted U, said body portion having clamp arms spring tensioned to grip opposite side walls of a telephone instrument casing; and means projecting laterally outwardly from one end of the body portion adapted for supporting a telephone handset in a suspended position adjacent one side of said casing.

3. A support for a telephone handset adapted for attachment to the casing of a wall-mounted telephone instrument comprising a body portion in the general form of a shallow, inverted U, said body portion having clamp arms spring tensioned to grip opposite side walls of a telephone instrument casing; a support arm projecting laterally outwardly from one end of the body portions; and an upwardly opening support hook carried by said support arm and adapted for engaging a telephone handset to suspend said handset at one side of the telephone instrument casing.

4. A support for a telephone handset adapted for attachment to the casing of a wall-mounted telephone instrument comprising a body portion in the general form of a shallow, inverted U, said body portion having clamp arms spring tensioned to grip opposite side walls of a telephone instrument casing; a support arm projecting laterally outwardly from one end of the body portion; and an upwardly opening support hook carried by said support arm and adapted for engaging a telephone handset to suspend said handset at one side of the telephone instrument casing, said support hook being disposed in a vertical plane.

5. A support for a telephone handset adapted for attachment to the casing of a wall-mounted telephone instrument comprising a body portion in the general form of a shallow, inverted U, said body portion having clamp arms spring tensioned to grip opposite side walls of a telephone instrument casing; a support arm projecting laterally outwardly from one end of the body portion; and an upwardly opening support hook carried by said support arm and adapted for engaging a telephone handset to suspend said handset at one side of the telephone instrument casing, said support hook being disposed in a vertical plane, the vertical plane of the support hook extending substantially normally to the length of said body portion.

6. A support for a telephone handset adapted for attachment to the casing of a wall-mounted telephone instrument comprising a body portion in the general form of a shallow, inverted U, said body portion having clamp arms spring tensioned to grip opposite side walls of a telephone instrument casing; a support arm projecting laterally outwardly from one end of the body portion; and an upwardly opening support hook carried by said support arm and adapted for engaging a telephone handset to suspend said handset at one side of the telephone instrument casing, said support hook being disposed in a vertical plane, the vertical plane of the support hook extending substantially normally to the length of said body portion, said body portion and support arm being disposed in a second vertical plane substantially perpendicular to the first plane.

7. A support for a telephone handset adapted for attachment to the casing of a wall-mounted telephone instrument, comprising a body portion in the general form of a shallow, inverted U adapted to straddle the upper end of said casing, said body portion being spring tensioned to grip the casing; and means projecting laterally outwardly from one end of said body portion and terminating in an upwardly opening support hook adapted to support a telephone handset in a suspended position adjacent one side of said casing, said body portion and said means being formed from a single length of wire material folded upon itself.

References Cited in the file of this patent

UNITED STATES PATENTS

| | | |
|---|---|---|
| 2,443,329 | Sears | June 15, 1948 |
| 2,658,116 | Skantze | Nov. 3, 1953 |